(12) United States Patent
Won et al.

(10) Patent No.: US 6,486,240 B1
(45) Date of Patent: Nov. 26, 2002

(54) METHOD FOR PRODUCING AN ASYMMETRIC SUPPORT MEMBRANE BY PHYSICAL GELATION AND THE MEMBRANES OBTAINED THEREBY

(75) Inventors: Jong Ok Won, Seoul (KR); Yong Soo Kang, Nowon-ku (KR); Hyun Chae Park, Seoul (KR); Un Young Kim, Seoul (KR); Seong Hyun Yoo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/428,994

(22) Filed: Oct. 28, 1999

(30) Foreign Application Priority Data

Oct. 28, 1998 (KR) ............................................. 98-45378

(51) Int. Cl.$^7$ ................................................. C08K 5/34
(52) U.S. Cl. ............. 524/104; 210/500.38; 210/500.39; 210/500.41; 210/500.42; 95/45; 428/315.9; 521/64; 521/61; 524/107; 524/111; 524/567; 524/600; 524/602; 524/609; 524/599; 524/612; 264/41
(58) Field of Search ................................ 524/104, 107, 524/111, 567, 600, 602, 609, 612, 599; 428/315.9; 521/64, 61; 210/500.38, 500.39, 500.41, 500.42; 95/45; 264/41

(56) References Cited

U.S. PATENT DOCUMENTS

| | | | | |
|---|---|---|---|---|
| 4,818,452 A | * | 4/1989 | Kneifel et al. | 264/41 |
| 4,871,494 A | * | 10/1989 | Kesting et al. | 264/41 |
| 4,933,085 A | * | 6/1990 | Kneifel et al. | 264/45.1 |
| 5,181,940 A | * | 1/1993 | Bikson et al. | 55/16 |
| 5,443,728 A | * | 8/1995 | Macheras et al. | 210/500.23 |
| 5,702,503 A | * | 12/1997 | Tse Tang | 95/45 |

* cited by examiner

Primary Examiner—Judy M. Reddick
(74) Attorney, Agent, or Firm—Oblon, Spivak, McClelland, Maier & Neustadt, P.C.

(57) ABSTRACT

An asymmetric support membrane can be prepared by using a phase separation method. The method includes immersing a polymer solvent solution into water. The polymer solution is made by dissolving 15 to 35% by weight of the polymer into a solvent that lets the polymer solution become a gel at a temperature of 0 to 50° C. The solution is then allowed to gel and brought into a final membrane form in water for phase separation and formation of the asymmetric support membrane. The polymer may be poly(vinyl chloride), polyethersulfone, polyetherimide and polyamic (methylester). The solvent is γ-butyrolactone alone as a major solvent or is a mixed solvent with N-methyl-2-pyrrolidone as a cosolvent. The asymmetric support membrane is a porous support membrane of a sponge form having open pores that are connected to one another with a narrow pore size distribution. Thus, the asymmetric support membrane has an improved permeance and mechanical strength. Further, because it has a narrow pore size distribution, a coating process can be optimized with a material having high selectivity. Therefore, the composite membranes having improved selectivity can be easily produced by the present invention.

3 Claims, 4 Drawing Sheets

METHOD FOR PRODUCING AN ASYMMETRIC SUPPORT MEMBRANE BY PHYSICAL GELATION AND THE MEMBRANES OBTAINED THEREBY

BACKGROUND OF THE INVENTION

1. Field of the Invention

The present invention relates to a method for producing an asymmetric support membrane for forming a composite membrane, and the asymmetric support membrane having a narrow pore size distribution and an improved permeance and mechanical strength. More particularly, the present invention relates to a method for producing an asymmetric support membrane using a phase separation method, which comprises fixing a structure of a polymer solution using a physical gelation property to easily control pore size and by which producing an asymmetric support membrane having a narrow pore size distribution and also a high permeance and mechanical strength; and the asymmetric support membranes obtained thereby.

2. Description of the Prior Art

The various methods for producing an asymmetric support membrane using a phase separation have been known in the art for some time.

A method for producing an asymmetric support membrane using a phase separation was carried out by Loeb and Sourirajan in U.S. Pat. No. 3,133,132. This method comprises dissolving a polymer as a membrane material in a suitable solvent to form a polymer solution and then immersing it into a non-solvent to bring about a phase separation to form an asymmetric support membrane in a flat plate or hollow fiber form.

Generally, the polymer solution exists as a network form in which the polymer chains are entangled with one another as the concentration increases. In order to produce the desired form of membrane, the polymer solution must have a sufficient viscosity and flowability so as to form the membrane.

However, if the flowability is too high, the entanglement of the physically formed network structure of the polymer chains becomes weak. Thus, when the polymer solution is met with a non-solvent to bring about a phase separation, i.e. when the non-solvent enters into the polymer solution and the solvent therein is flowed off onto the non-solvent, macrovoids are formed and a membrane having a huge pore size is produced by the thermodynamic or kinetic property. Thus, the mechanical strength of the membrane is weakened, or the membrane permeance is decreased due to the rapid phase separation and the shrinkage during the dryness, or defects are produced.

As described above, the polymer solution generally exists as a network structure having uniform distance that the polymer chains are entangled with one another. If the network structure of the polymer solution is physically fixed and maintained when producing an asymmetric membrane using a phase separation, a membrane having the fixed form of the network structure is produced. The membrane can be converted into a membrane of sponge structure having a homogeneous pore size and a high permeance by means of a phase conversion procedure.

SUMMARY OF THE INVENTION

Accordingly, it is an object of the invention to provide a method for producing an asymmetric support membrane for a composite membrane by a phase separation, which comprises fixing a structure of a polymer solution using a physical gelation property to easily control a pore size. The membrane as obtained has a narrow pore size distribution, and an improved permeance and mechanical strength.

DETAILED DESCRIPTION OF THE INVENTION

Figure 1A:
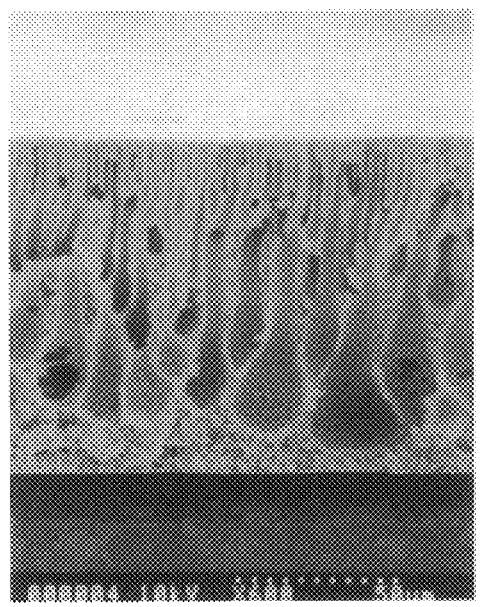
FIG. 1A shows a finger structure of an asymmetric support membrane.
Figure 1B:
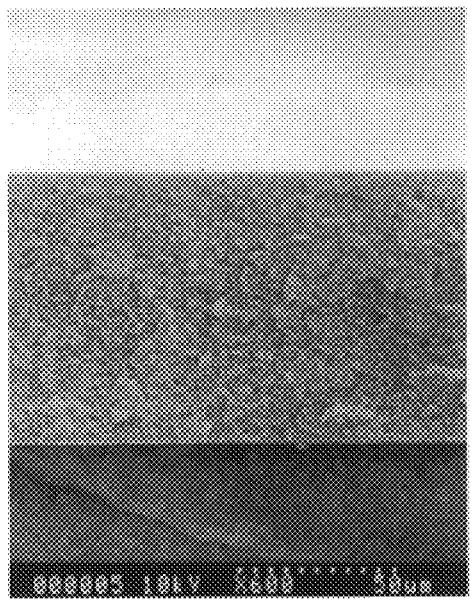
FIG. 1B shows a sponge structure thereof.

The present invention is directed to a method for producing an asymmetric support membrane using a phase separation method by immersing a polymer solution consisting of a polymer and a solvent into a non-solvent, which comprises the steps of:

1) dissolving 15 to 35% by weight of the polymer, based on the total weight of the polymer solution, into the solvent that lets the polymer solution become a gel at 0 to 50° C., that is a major solvent alone or a mixed solvent in which a co-solvent is added to a major solvent to prepare the polymer solution, and 2) making the polymer solution obtained in step 1) into the final membrane form and allow the formation of physical gelation and then immersing it into water as the non-solvent to bring about the phase separation to form the asymmetric support membrane; and the asymmetric support membrane having a narrow pore size distribution and an improved permeance and mechanical strength as obtained thereby.

Hereinafter, the method for producing an asymmetric support membrane of the invention is specifically described.

Firstly, in accordance with the present invention, 15 to 35% by weight of a polymer, based on the total weight of a polymer solution is dissolved into a solvent that lets the polymer solution become a gel at 0 to 50° C., that is a major solvent alone or a mixed solvent in which a co-solvent is added to a major solvent to prepare the polymer solution. In the present invention, the polymer solution is used to produce the asymmetric support membrane by physical gelation. Thus, any polymer solution which can be physically gelated may be applicable. In practice, it is suitable for the system that the physical gel is formed at 0 to 50° C.

A suitable polymer comprises a system that a physical gel is formed in γ-butyrolactone alone as a major solvent or its mixed solvent with N-methyl-2-pyrrolidone as a co-solvent. For example, a polymer such as poly(vinylchloride), polyethersulfone, polyetherimide and polyamic (methylester) may comprise a system in which a physical gel is formed in γ-butyrolactone alone or a mixed solvent with a co-solvent. The most preferable polymer as a membrane material is polyethersulfone.

According to the invention, if the polymer solution is formed into a physical gel and then immersed into a non-solvent, the network structure of the polymer solution is greatly maintained and the pores are connected to one another. As a result, the polymer support membrane of a sponge structure having an improved mechanical property, such as a high gas permeance and a narrow pore size distribution, can be obtained.

The amount of the polymer as used in the present invention is preferably 10 to 40% by weight and more preferably 15 to 35% by weight based on the total weight of the polymer solution.

The solvents useful to produce the polymer solution must completely dissolve the polymer and change the state of the polymer solution into a physical gel depending on a temperature or time change. Solvents that use γ-butyrolactone as a major solvent can be used for this purpose.

The distance between chains constituting the network structure in the polymer solution has an important role for determining the pore size (at least on the surface) of the asymmetric membrane in which the network structure of the polymer solution is formed. Generally, a concentrate polymer solution has polymer chains of different lengths (which is also referred to as a correlation length), depending on the solvent used. In order to control the correlation length, a mixed solvent can be used.

Therefore, according to the invention, the polymer solution is prepared by dissolving polyethersulfone into a single solvent or a mixed solvent. More particularly, γ-butyrolactone is used as a major solvent to form a physical gel of the polymer solution, and. N-methyl-2-pyrrolidone compatible with the major solvent, is used as a co-solvent together with the major solvent to control the pore size.

Thereafter, the obtained polymer solution is made into a final membrane form such as a flat plate and, after being physically gelated, is immersed into the non-solvent to bring about the phase separation to form a membrane. The membrane is immersed into water for 24 hours or more to remove the solvent and then dried in air to produce an asymmetric support membrane.

The membrane which is immersed into a non-solvent prior to the gelation of the polymer solution is an asymmetric membrane having a finger structure. However, the asymmetric membrane obtained by the method according to the present invention is one that is produced after the complete gelation of the polymer solution and has a sponge structure with a high mechanical strength. Further, the pores which are connected to one another form a porous support layer having low permeation resistance. Thus, the membrane can be used as a reverse osmotic membrane for the separation of gas and a support membrane for pervaporization.

Furthermore, a coating process is introduced to form a composite membrane using the asymmetric support membrane. In order not to lower the permeance of the support membrane, the coating thickness must be thin. For this purpose, the size of the pore on the surface of the support membrane must be small and the size distribution must be narrow. The support membrane obtained by the method according to the present invention has a narrow pore size distribution, so that a material having a higher selectivity can be coated onto the membrane. Thus, a composite membrane having also improved selectivity can be prepared.

DESCRIPTION OF THE PREFERRED EMBODIMENTS

The present invention will be illustrated in greater detail by way of the following examples and accompanying drawings. The examples are presented for illustrative purposes only and should not be construed as limiting the range of the invention.

Comparative Examples 1–6

The polymer solutions were prepared by dissolving 15% by weight of polyethersulfone in a mixed solvent containing γ-butyrolactone (γ-BL) as a major solvent and N-methyl-2-pyrrolidone (NMP) as a co-solvent in a specified ratio as shown in Table 1.

The obtained polymer solutions were then left to sit at room temperature for 96 hours, and a physical gelation of the solutions, depending on the amount of time that had expired, was observed. The results are shown in Table 1. Also, as shown in Table 1, when the ratio of γ-BL/NMP is above 85/15, the polyethersulfone polymer solutions convert from sol to gel after sitting at room temperature for 96 hours.

All polymer solutions shown in Table 1 were returned to a sol state and immediately made into a film form and then phase-separated in water as a non-solvent to form asymmetric support membranes. The asymmetric membranes, thus obtained, were immersed into a non-solvent of water for 24 hours to remove the solvent and then dried at room temperature. Gas permeance was determined by a bubble flow meter. In Table 1 below, $P(O_2)$ and $P(N_2)$ represent oxygen permeance and nitrogen permeance, respectively, in units of GPU [1 GPU=$10^{-6}$·cm$^3$ (STP)/cm$^2$cmHgsec]. Also, the structures of the membranes were observed by a scanning electronic microscope. All membranes as obtained were asymmetric membranes having a finger structure. These results are also shown in Table 1.

TABLE 1

| Sample | γ-BL/NMP Composition | Solution State* | $P(O_2)$ GPU | $P(N_2)$ GPU | Selectivity $P(O_2)/P(N_2)$ | Membrane Structure |
|---|---|---|---|---|---|---|
| Comp. Example 1 | 100/0 | gel | 5.06 | 3.33 | 1.52 | finger |
| Comp. Example 2 | 95/5 | gel | 175 | 186 | 0.94 | finger |
| Comp. Example 3 | 90/10 | gel | 1779 | 1985 | 0.90 | finger |
| Comp. Example 4 | 85/15 | gel | 471 | 526 | 0.89 | finger |
| Comp. Example 5 | 80/20 | sol | 359 | 406 | 0.88 | finger |
| Comp. Example 6 | 60/40 | sol | 211 | 240 | 0.88 | finger |

*These solution states were obtained after sitting at room temperature for 96 hours.

EXAMPLES 1–3

Figure 2A:
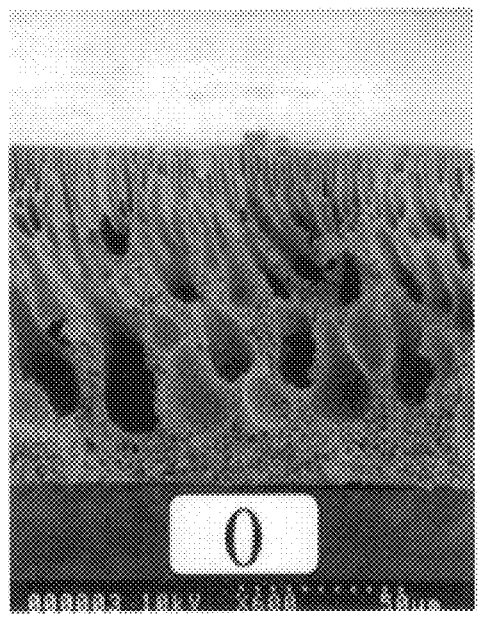
FIGS. 2A to 2C show the structures of membranes obtained by Comparative Example 3, Example 1 and Example 2.

The polyethersulfone polymer solutions were prepared at a concentration of 15% by weight using a mixed solvent in which the ratio of γ-butyrolactone/N-methyl-2-pyrrolidone is 90/10. Since the polymer solutions are converted from sol to gel depending on time, the polymer solutions in a sol state were made into a film form and sealed to prevent them from drying. Thereafter, the polymer solutions in a film form were immersed into a non-solvent of water according to the aging time to form asymmetric membranes. The gas permeance and structure of the asymmetric membranes were measured and the results are shown in Table 2 and FIG. 2A to FIG. 2C.

TABLE 2

| Sample | Aging Time | $P(O_2)$ GPU | $P(N_2)$ GPU | Selectivity $P(O_2)/P(N_2)$ |
|---|---|---|---|---|
| Comp. Example 3 | 0 | 1779 | 1985 | 0.90 |
| Example 1 | 24 | 6690 | 7576 | 0.88 |
| Example 2 | 48 | 4152 | 4996 | 0.83 |
| Example 3 | 78 | 4854 | 5417 | 0.90 |

Figure 2B:
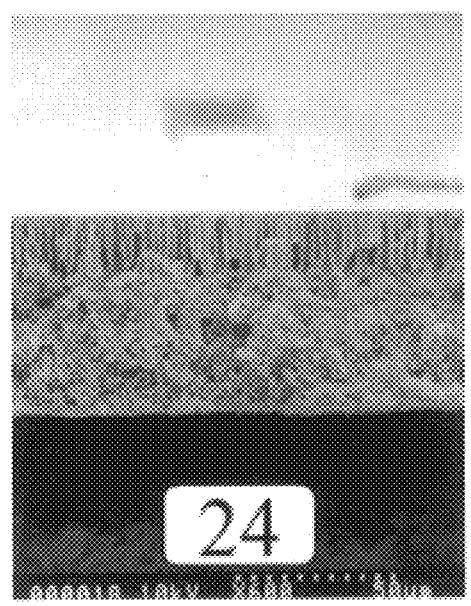
Figure 2C:

The polymer solutions as prepared in a film form were left to sit for a fixed amount of time and then immersed into a non-solvent of water to obtain the membranes (Examples 1–3). The membranes showed some finger structures on their surfaces as shown in FIG. 2B and FIG. 2C. However, the membranes of the present examples had a structure similar to the sponge form, having a smaller size and a lower number of finger structures when compared with the membrane obtained in a sol state (Comparative Example 3, FIG. 2A. Further, the mechanical strengths were increased.

EXAMPLES 4–6

The polymer solutions were prepared by the same method as Examples 1–3 except that the amount of polyethersulfone was 25% by weight. The polymer solutions were made into a film form and left to sit for a fixed amount of time under conditions that prevented the evaporization of the solvent and then were immersed into a non-solvent of water to form asymmetric membranes. The gas permeance and structure of the asymmetric membranes were measured and the results are shown in Table 3 and FIG. 3A to FIG. 3B.

TABLE 3

| Sample | Aging Time | $P(O_2)$ GPU | $P(N_2)$ GPU | Selectivity $P(O_2)/P(N_2)$ |
|---|---|---|---|---|
| Example 4 | 48 | 35 | 37 | 0.93 |
| Example 5 | 96 | 622 | 705 | 0.88 |
| Example 6 | 120 | 2712 | 2998 | 0.90 |

Figure 3A:
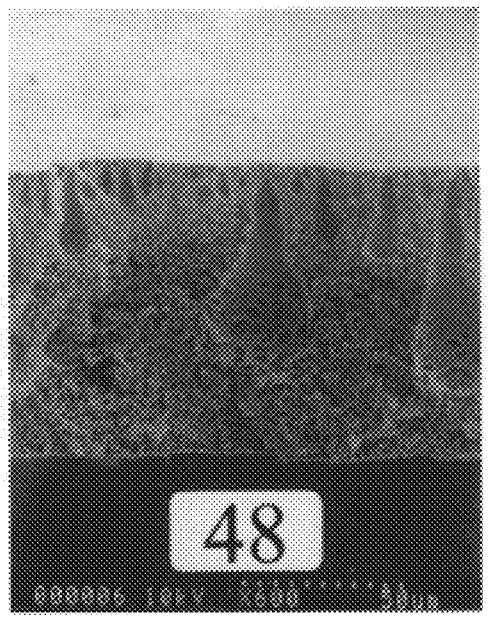
FIGS. 3A and 3B show the structures of membranes obtained by Example 4 and Example 5.
Figure 3B:
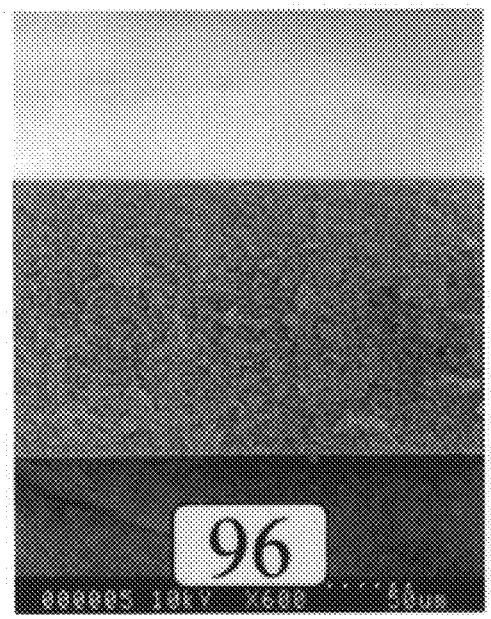

The asymmetric membrane obtained by immersing the polymer solutions, in film form, into water prior to 96 hours (Example 4) showed a structure similar to the sponge form shown in FIG. 3A, but had a finger structure, even though their size and number were reduced depending on time. However, the membranes obtained by preparing the polymer solution in a film form and then immersing into water after 96 hours (Examples 5 and 6) showed a sponge structure that was free from finger structures and also had a remarkably high gas permeance, as shown in FIG. 3B.

EXAMPLES 7–9

15% by weight of polyethersulfone was dissolved into γ-butyrolactone to prepare the polymer solutions. The state of the polymer solutions was converted into a gel at room temperature after a period of one day. The polymer solutions in a sol state were made into a film form and left to sit for a fixed amount of time under conditions that prevented the evaporization of the solvent and then immersed into a non-solvent of water to form asymmetric membranes. The gas permeance and structure of the asymmetric membranes were measured and the results are shown in Table 4.

TABLE 4

| Sample | Aging Time | $P(O_2)$ GPU | $P(N_2)$ GPU | Membrane Structure |
|---|---|---|---|---|
| Example 7 | 3 | 123 | 130 | sponge |
| Example 8 | 6 | 267 | 291 | sponge |
| Example 9 | 9 | 230 | 252 | sponge |

The asymmetric membranes obtained by dissolving the polymer solution into γ-butyrolactone, made into a film form and then left to sit at room temperature for a fixed amount of time showed not only a sponge structure but also a remarkably increased gas permeance.

EXAMPLES 10–11

Asymmetric membranes were produced by the same method Examples 1–3 except that 25% by weight of polyethersulfone was dissolved into a mixed solvent in which the ratio of γ-butyrolactone/N-methyl-2-pyrrolidone was 85/15. The gas permeance and structure of the asymmetric membranes were measured and the results are shown in Table 5.

| Sample | Aging Time | $P(O_2)$ GPU | $P(N_2)$ GPU | Selectivity $P(O_2)/P(N_2)$ |
|---|---|---|---|---|
| Example 10 | 72 | 0.886 | 0.315 | 2.82 |
| Example 11 | 142 | 3.94 | 3.54 | 1.11 |

Since the polymer solutions in the present examples were incorporated with more N-methyl-2-pyrrolidone (as much as 5% by weight) than those in Examples 1–3, it took more times (about 10 days) to convert the state of the polymer solution into a gel. Also, the membrane obtained after sitting at room temperature for 96 hours (Example 11) had a remarkably reduced size and number of finger structures, but its surface had somewhat smaller fingers when compared with the asymmetric membranes obtained by Examples 1–3.

This shows that the physical gel was formed in the above system but the entanglement power was reduced due to an increase in the amount of N-methyl-2-pyrrolidone as a co-solvent. Also, because of the effect of N-methyl-2-pyrrolidone having a good compatibility with water when contacting with it, the finger structure was obtained. At the same time, it seems that the surface of the membrane became dense so that a membrane having selectivity was obtained. However, it is noted that the more it gelated, the more the gas permeance increased.

EXAMPLE 12

The polyetherimide polymer solution at a concentration of 15% by weight, was prepared using mixed solvent in which the mixed ratio of γ-butyrolactone/N-methyl-2-pyrrolidone was 95/5. Since polyetherimide was not dissolved at room temperature, the solution was heated. At room temperature, the gelation was brought about together with a phase separation. The dissolved solution was stored in an oven set at 70° C. In order to cast the membrane onto a glass plate, the polymer solution, glass plate and knife were all placed in an oven set at 70° C. After rapidly removing them from the oven, the membrane was casted onto the glass plate to convert the state of the polymer solution into a gel without phase separation and then immersed it into a non-solvent of water to produce an asymmetric membrane.

The obtained asymmetric membrane was immersed into water for 24 hours to remove the solvent and then dried in air to measure the gas permeance. Nitrogen permeance through the membrane. $P(N_2)$ was 5046 GPU and the membrane showed a sponge structure.

In accordance with the present invention, asymmetric membranes were produced by physically gelating the polymer solution of a membrane form consisting of a polymer-solvent system having a property of sol-gel conversion in a specific solvent with changing the conditions (temperature or time) and immersing this into a non-solvent of water. The membranes were porous support membranes having a sponge structure in which a network structure of the polymer solution was maintained and had open pores that were connected to one another. Therefore, the membranes had a superior structure having a narrow pore size distribution.

Thus, the asymmetric support membranes according to the present invention had an improved permeance and mechanical strength. Further, since they have a narrow pore size distribution, the coating process can be optimized for coating with a material having a high selectivity. Therefore, the composite membrane having also improved selectivity can be easily produced by the present invention.

What is claimed is:

1. A method for producing an asymmetric support membrane, said method comprising:
   1) dissolving a polymer in a solvent to form a solution containing 15 to 35 wt. % of said polymer, and
   2) allowing said solution to form a physical gel then immersing said physical gel into water to form said asymmetric support membrane by phase separation, wherein said polymer is selected from the group consisting of poly(vinyl chloride), polyethersulfone, polyetherimide and polyamic(methylester);

said solvent is capable of dissolving said polymer to form a gel at 0 to 50° C., said solvent is γ-butyrolactone or a mixture of γ-butyrolactone with N-methyl-2-pyrrolidone; and wt. % is based on the total weight of the polymer solution.

2. The method according to claim 1, wherein the polymer is polyethersulfone.

3. An asymmetric support membrane produced by the method of claim 1 having a narrow pore size distribution and an improved gas permeance and mechanical strength.

* * * * *